United States Patent
Kumar et al.

(10) Patent No.: US 9,624,803 B2
(45) Date of Patent: Apr. 18, 2017

(54) SYSTEM, METHOD, AND APPARATUS FOR IMPROVED DESULFURIZATION OF AFTERTREATMENT COMPONENTS

(71) Applicant: Cummins Inc., Columbus, IN (US)

(72) Inventors: Ashok Kumar, Columbus, IN (US); Michael A. Smith, Columbus, IN (US); Krishna Kamasamudram, Columbus, IN (US); Neal Currier, Columbus, IN (US); Aleksey Yezerets, Columbus, IN (US)

(73) Assignee: Cummins Inc., Columbus, IN (US)

( * ) Notice: Subject to any disclaimer, the term of this patent is extended or adjusted under 35 U.S.C. 154(b) by 60 days.

(21) Appl. No.: 14/826,704

(22) Filed: Aug. 14, 2015

(65) Prior Publication Data
US 2015/0354424 A1 Dec. 10, 2015

Related U.S. Application Data

(63) Continuation of application No. PCT/US2014/015806, filed on Feb. 11, 2014.
(Continued)

(51) Int. Cl.
| | |
|---|---|
| *F01N 11/00* | (2006.01) |
| *F01N 3/20* | (2006.01) |
| *F01N 3/10* | (2006.01) |
| *F02D 41/00* | (2006.01) |
| *F02D 43/04* | (2006.01) |

(Continued)

(52) U.S. Cl.
CPC ........... *F01N 3/2066* (2013.01); *F01N 3/106* (2013.01); *F01N 3/208* (2013.01); *F01N 9/00* (2013.01); *F01N 9/005* (2013.01); *F01N 11/002* (2013.01); *F01N 13/009* (2014.06); *F02B 37/22* (2013.01); *F02D 41/005* (2013.01); *F02D 43/04* (2013.01); *F01N 2570/04* (2013.01);
(Continued)

(58) Field of Classification Search
CPC .... F01N 3/0818; F01N 3/0871; F01N 3/0885; F01N 2900/1612; F01N 2900/1621; F02D 41/027; F02D 41/0275; F02D 2200/0818
See application file for complete search history.

(56) References Cited

U.S. PATENT DOCUMENTS

| | | | |
|---|---|---|---|
| 4,795,726 | A | 1/1989 | Schaper et al. |
| 5,270,272 | A | 12/1993 | Galperin et al. |

(Continued)

FOREIGN PATENT DOCUMENTS

| | | | |
|---|---|---|---|
| DE | 19753573 | A1 | 6/1999 |
| DE | 102007060623 | A1 | 6/2009 |

(Continued)

OTHER PUBLICATIONS

European Patent Office, International Search Report in corresponding Application No. PCT/US2014/015806, mailed Jun. 10, 2014, 3 pp.

*Primary Examiner* — Jonathan Matthias
(74) *Attorney, Agent, or Firm* — Taft Stettinius & Hollister LLP (57) ABSTRACT

Systems, methods, and apparatuses are provided for determining an SCR component sulfur value, determining whether the SCR component sulfur value exceeds a sulfur regeneration threshold and increasing an engine NO amount incident to an SCR catalyst in response to the SCR component sulfur value exceeding the sulfur regeneration threshold.

24 Claims, 5 Drawing Sheets

Related U.S. Application Data

(60) Provisional application No. 61/765,715, filed on Feb. 16, 2013.

(51) Int. Cl.
*F02B 37/22* (2006.01)
*F01N 13/00* (2010.01)
*F01N 9/00* (2006.01)

(52) U.S. Cl.
CPC ............ *F01N 2900/1402* (2013.01); *F01N 2900/1612* (2013.01); *Y02T 10/24* (2013.01); *Y02T 10/47* (2013.01)

(56) References Cited

U.S. PATENT DOCUMENTS

| | | |
|---|---|---|
| 5,585,081 A | 12/1996 | Chu et al. |
| 6,300,268 B1 | 10/2001 | Lapidus et al. |
| 8,141,340 B2 | 3/2012 | Garimella et al. |
| 8,617,495 B1 * | 12/2013 | Funk ............ F02D 41/028 422/105 |
| 2009/0247392 A1 | 10/2009 | Ghorishi et al. |
| 2014/0056789 A1 | 2/2014 | Mussmann et al. |

FOREIGN PATENT DOCUMENTS

| | | |
|---|---|---|
| EP | 2492464 A1 | 8/2012 |
| EP | 2557285 A1 | 2/2013 |
| WO | 2009135071 A2 | 11/2009 |

* cited by examiner

SYSTEM, METHOD, AND APPARATUS FOR IMPROVED DESULFURIZATION OF AFTERTREATMENT COMPONENTS

CROSS-REFERENCE TO RELATED APPLICATION

The present application is a continuation of International App. No. PCT/US2014/015806 filed on Feb. 11, 2014, which claims the benefit of the filing date of U.S. Provisional Application No. 61/765,715 filed on Feb. 16, 2013, which is incorporated herein by reference in its entirety for all purposes.

BACKGROUND

Modern internal combustion engine systems often utilize aftertreatment devices to treat the engine exhaust and reduce exhaust emissions. Commonly used devices include catalytic elements, such as oxidation catalysts, catalyzed particulate filters, and selective catalytic reduction (SCR) systems. Many catalytic elements have catalyst materials which are neutralized, deactivated, or experience reduced effectiveness when exposed to sulfur compounds over time. The deactivation by sulfur over time is an accumulative process, limiting the effective life of the catalytic component, or requiring periodic removal of the sulfur compounds.

Presently known sulfur removal processes require bringing the targeted aftertreatment component up to a very high temperature, typically to a temperature exceeding even particulate filter regeneration temperatures. Typical sulfur removal processes involve temperatures exceeding 650° C., 700° C., or 750° C. Immediate catalyst failures can occur at 900° C., 850° C., 800° C., or lower, due to the catalyst composition, physical structure and materials, required activity level to meet the mission of the catalyst, limiting reaction mechanism in the aftertreatment system at various operating conditions (e.g. mass transfer limited—pore diffusion, bulk diffusion, or surface diffusion, reaction rate limited, etc.). Even at lower temperatures within the designed sulfur removal range, greatly accelerated catalyst and other component aging can occur. Also, where high temperatures are required that would not normally, or only rarely, be experienced during normal operations of the application, presently known desulfurization operations may significantly impact fuel economy, mission performance of the engine, and/or be impractical during operations and require that desulfurization be performed as a service event. Performance of desulfurization is undesirable as this increases costs and causes downtime of the system.

Because the aftertreatment component to be regenerated is typically inline with the entire exhaust system, when the sulfur removal occurs during operation on an application (e.g. for a truck in the field), and even in some situations as a service event, the entire aftertreatment system is heated similarly to the component to be regenerated. If the heating is to occur in isolation for the single aftertreatment component, a removal and service process must occur that takes the application (e.g. a vehicle) offline during the process.

The high temperatures experienced during previously known sulfur removal processes greatly increase the aging of the catalyst and other components of the aftertreatment system. Further, components upstream of the regenerated component may need to be heated to an even greater temperature to accommodate heat losses in the system and ensure the downstream regenerated component achieves the required temperature. The response of the system to aging of components and sulfur removal is generally exponential with temperature. Accordingly, minor control variations in the sulfur removal temperature either greatly extend the sulfur removal process time (low temperature), cause the sulfur removal process to fail (too low of a temperature), greatly increase the aging of catalytic or other aftertreatment components (high temperature), or cause immediate failure in catalytic or other aftertreatment components (too high of a temperature). A poorly controlled temperature during a desulfurization can cause both excessive aging and extended desulfurization time, and as such, further advancements in this area are desirable.

SUMMARY

One embodiment disclosed herein involves a unique method for increasing an NO amount from an engine incident to a selective catalytic reduction (SCR) catalyst upon determining an SCR component sulfur value exceeds a sulfur regeneration threshold. In another embodiment, a system is disclosed including an internal combustion engine, an SCR component, an oxidation catalyst, and a controller structured to provide an NO increase command in response to determining an SCR component sulfur value exceeds a sulfur regeneration threshold. In an additional embodiment, an apparatus is disclosed that is structured to provide a catalyst regenerating command in response to an SCR component sulfur value and at least one of an NO increase command and an NO2 reduction command in response to the catalyst regenerating command.

Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
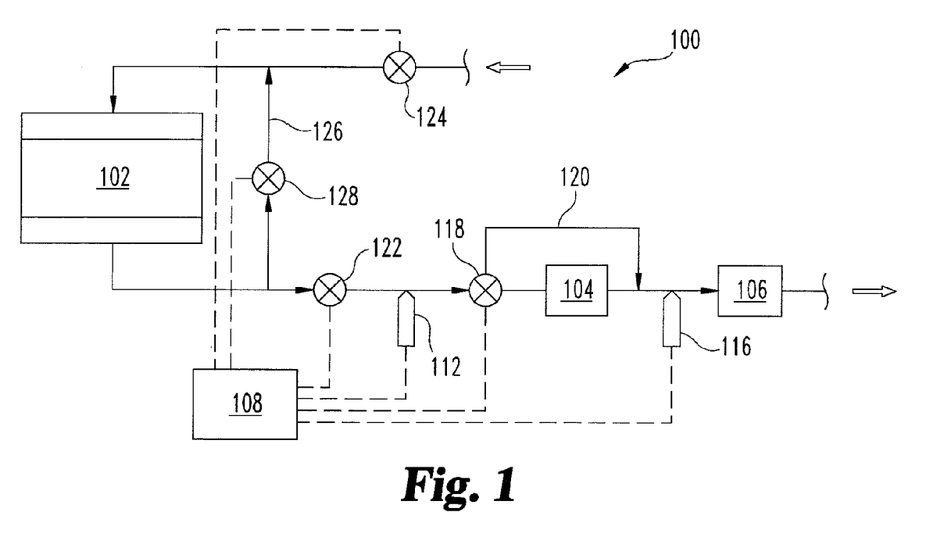
FIG. 1 is a schematic block diagram of a system including an engine and an exemplary exhaust aftertreatment system.

Referencing FIG. 1, a system 100 includes an internal combustion engine 102 producing an exhaust gas having a NO constituent. The engine 102 may be any kind known in the art, including a diesel, gasoline, natural gas, or any other engine producing exhaust gases having $NO_x$. The system 100 includes a selective catalytic reduction (SCR) component 106 operationally coupled to the exhaust gas. In the example system 100, the exhaust gas passes through the SCR component 106, where a portion of the NOx in the exhaust gases is converted into N2, either in real-time or in adsorption-reaction cycle or adsorption-desorption-reaction cycle. The system 100 further includes an oxidation catalyst 104 operationally coupled to the exhaust gas at a position upstream of the SCR component 106. The oxidation catalyst 104 performs several operations on the exhaust gases by design or as a side effect of operation, including oxidizing unburned hydrocarbons (HC) in the exhaust gases, and by oxidizing a portion of NO in the exhaust gases into $NO_2$. The NOx in the exhaust gases may be present as both NO and $NO_2$, and in certain embodiments, the engine 102 produces more NO than $NO_2$, and under certain conditions the oxidation catalyst 104 is efficient at converting NO to $NO_2$, so that under certain overall operating conditions of the system 100 the $NO_2$ amount in the exhaust gases downstream of the oxidation catalyst 104 can be significantly higher than the $NO_2$ amount in the exhaust gases upstream of the oxidation catalyst 104.

The exhaust gases also contain an amount of sulfur. The sulfur may be present as a constituent of the fuel or various lubricants in the engine 102. Sulfur is adsorbed onto the SCR component 106, displacing catalyst sites for $NO_x$ conversion and "poisoning" or reducing the $NO_x$ conversion effectiveness of the SCR component 106. The adsorbed sulfur is a relatively permanent condition, and in the presently known art very high temperatures are required to drive the sulfur off in significant amounts and regenerate the catalyst. The high temperatures required to regenerate the catalyst can damage or reduce the operating life of the SCR component 106, the oxidation catalyst 104, or other catalysts or components of the engine aftertreatment system. The high temperatures are also relatively expensive (fuel economy, part wear increase, service life decrease, etc.) and inconvenient or impossible to achieve, depending upon the duty cycle and operating conditions of the engine 102 and system 100.

In certain embodiments, the system includes a means for increasing an engine NO amount incident to the SCR component 106. Non-limiting examples of a means for increasing the engine NO amount incident to the SCR component 106 are described following, but any means for increasing the engine NO amount incident to the SCR component 106 described herein is contemplated as a means for increasing the engine NO amount incident to the SCR component 106.

An example means for increasing the engine NO amount incident to the SCR component 106 includes increasing an exhaust gas temperature. Example operations to increase an exhaust gas temperature include, without limitation, providing post injection fueling in the engine 102, retarded fuel timing in the engine 102, injecting hydrocarbons (e.g. via an injector 112) upstream of the oxidation catalyst 104 to increase the temperature, partially closing an intake throttle 124, increasing an EGR flow 126 rate, partially closing an exhaust throttle 122, increasing a backpressure from a turbocharger, not shown, with a variable geometry turbocharger (VGT), for example. The described operations to increase the exhaust gas temperature are non-limiting examples. Any exhaust gas temperature operations that reduce the effectiveness of the conversion of NO to NO2 in the oxidation catalyst 104 are contemplated herein. Certain operations, such as increasing the EGR flow 126 rate, have a competing effect of reducing total $NO_x$ emissions. Accordingly, one of skill in the art having the benefit of the disclosures herein will understand that the competing effects of increasing the NO portion of the total $NO_x$, while reducing the total $NO_x$, may result in increased engine out NO incident to the SCR component 106 only under certain operating conditions. At different operating conditions and/or operating times, various ones of the means for increasing the engine out NO incident to the SCR component 106 may be utilized in a particular system.

Another non-limiting means for increasing the engine NO amount incident to the SCR component 106 includes bypassing all or a portion of exhaust gases around the oxidation catalyst 104 positioned upstream of the SCR catalyst component 106. For example, the system 100 may include a bypass valve 118 and a bypass line 120 that bypasses all or a portion of the oxidation catalyst 104. When the gases bypass the oxidation catalyst 104, conversion of NO to $NO_2$ on the oxidation catalyst 104 does not occur, and the amount of engine out NO incident to the SCR component 106 is thereby increased. In certain embodiments, the bypass valve 118 is responsive to an oxidation catalyst bypass command from a controller 108.

Another non-limiting means for increasing the engine NO amount incident to the SCR component 106 includes increasing a $NO_x$ output amount from the engine 102. Non-limiting example operations to increase the $NO_x$ output amount include advancing a fueling timing in the engine 102, including advancing a main injection timing and/or providing a pilot injection event. Systems 100 having multiple injection events and/or shaped injection events may include a common rail fuel system. In certain embodiments, the system 100 includes the controller 108 commanding an EGR flow valve 128 to lower the rate of EGR flow 126 to increase the engine out $NO_x$ amount. One of skill in the art having the benefit of the disclosures herein will recognize that certain operations to increase the engine out $NO_x$ amount may have an effect to reduce a temperature of the oxidation catalyst 104. Accordingly, certain operations and/or components may be utilized at certain operation conditions. For example, at certain operating conditions, an EGR flow 126 increase may cause the engine out NO amount incident to the SCR component 106 to increase, and at other operating conditions, an EGR flow 126 decrease may cause the engine out NO amount incident to the SCR component 106 to decrease.

Another non-limiting means for increasing the engine NO amount incident to the SCR component 106 includes increasing an exhaust flow rate of the exhaust gas. Example and non-limiting means for increasing the exhaust flow rate of the exhaust gas include providing an increased engine power output, providing a gear ratio change command and the system including a transmission (not shown) responsive to the gear ratio change command, opening the exhaust throttle 122 and/or the intake throttle 124, and/or providing a command for changing a variable geometry turbocharger (VGT). The increase of the exhaust flow rate increases the space velocity of the exhaust flow in the oxidation catalyst 104, and in certain operating conditions can reduce the overall conversion of NO to $NO_2$ in the oxidation catalyst 104, thereby increasing the engine NO amount incident on the SCR component 106.

Another non-limiting means for increasing the engine NO amount incident to the SCR component 106 includes providing the oxidation catalyst 104 positioned upstream of the SCR catalyst component 106 with an increased Pd amount or an increased Pd:Pt ratio. The Pt content of the oxidation catalyst 104 has a greater activity for the NO to NO$_2$ reaction than Pd or other noble metals. Accordingly, an oxidation catalyst formulation having a decreased Pt content may be less likely to produce a high conversion of NO to NO$_2$ at most operating conditions. The use of Pd can provide for oxidation capability—for example to oxidize unburned hydrocarbons or volatile organic compounds—without excessive generation of NO$_2$. The amount of included Pd or the ratio of Pd:Pt that corresponds to an increased amount of Pd or an increased ratio of Pd:Pt depends upon the specific system, but any amount that results in a higher amount of Pd than a system designed only for considerations of oxidizing hydrocarbons, and any system designed to specifically enhance NO$_2$ generation corresponds to an increased Pd amount is contemplated. Additionally or alternatively, the oxidation catalyst 104 having an increased Pd amount or an increased Pd:Pt ratio may be provided in the bypass line 120 for utilization during a desulfation event.

Another non-limiting means for increasing the engine NO amount incident to the SCR component 106 includes providing an increased reductant amount to the oxidation catalyst 104 positioned upstream of the SCR catalyst component 106, and/or providing an unburned HC amount to the oxidation catalyst 104 positioned upstream of the SCR catalyst component 106. In addition to the effect of the unburned HC amount on the oxidation catalyst 104, which can increase the temperature of the oxidation catalyst 104, the unburned HC amount and/or other reductant, such as a reductant injected upstream of the SCR component 104 via a reductant injector 116, for example, can compete with the NO to NO$_2$ reaction to reduce the overall conversion of NO to NO$_2$.

One of skill in the art contemplating a particular system will ordinarily have sufficient information available for the system to determine operating conditions where adjustments to the rate of the EGR flow 126, fuel timing, intake throttle 124 and/or exhaust throttle 122, exhaust gas temperature, exhaust flow rate, and/or other adjustments described herein will have an increasing effect on the engine NO amount that is incident to the SCR component 106. The response of the engine NO amount incident to the SCR component 106 can reverse in certain operating conditions relative to rate of the EGR flow 126, fuel timing, and/or exhaust flow rate adjustments. The engine NO amount that is incident to the SCR component 106 can move with, or move in reverse of, the exhaust gas temperature, the rate of the EGR flow 126, and/or the exhaust gas flow rate depending upon the reaction limiting factors, the amount of NO$_x$ produced by the engine, and/or the amount of NO converted to NO$_2$ in the oxidation catalyst 104 at various operating conditions. The temperatures, exhaust gas flow rates, and NO$_x$ concentrations at which various responses increase or decrease the engine NO amount incident to the SCR component 106 are dependent upon the catalyst composition of the oxidation catalyst 104, the engine 102 combustion recipe and performance, the engine 102 fuel system and turbocharger type and capabilities, and the oxidation catalyst 104 pore structure and loading amount. Accordingly, while the system conditions wherein any given NO increasing means are applicable cannot be specified in advance with any particularity, one of skill in the art having the benefit of the disclosures herein and information that is ordinarily available can readily determine which NO increasing means are applicable for which operating conditions of the system.

In certain embodiments, the system 100 further includes the controller 108 structured to perform certain operations to increase the engine NO amount incident to the SCR component 106. In certain embodiments, the controller 108 forms a portion of a processing subsystem including one or more computing devices having memory, processing, and communication hardware. The controller 108 may be a single device or a distributed device, and the functions of the controller 108 may be performed by hardware or software.

In certain embodiments, the controller 108 includes one or more modules structured to functionally execute the operations of the controller 108. In certain embodiments, the controller 108 includes a catalyst status module, a catalyst diagnostic module, and/or a catalyst recovery module. The description herein including modules emphasizes the structural independence of the aspects of the controller 108, and illustrates one grouping of operations and responsibilities of the controller 108. Other groupings that execute similar overall operations are understood within the scope of the present application. Modules may be implemented in hardware and/or software on a non-transient computer readable storage medium, and modules may be distributed across various hardware or software components. More specific descriptions of certain embodiments of the controller 108 operations are included in the section referencing FIG. 2.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The system 100 includes an example controller 108 that interprets an SCR component sulfur value, determines whether the SCR component sulfur value exceeds a sulfur regeneration threshold, and provides an NO increase command in response to the SCR component sulfur value exceeding the sulfur regeneration threshold. The means for increasing the engine NO amount incident to the SCR component 106 is responsive to the NO increase command. Example and non-limiting operations of the controller 108 to interpret the SCR component sulfur value include accumulating an engine operating time, an amount of fuel burned by the engine 102, a time since a last sulfur regeneration event of the SCR component 106, and/or a lubricant consumption amount by the engine 102. Additionally or alternatively, additional potential sulfur sources such as dosed hydrocarbons from the injector 112 may also be tracked. Accumulation or tracking of any parameter that can be correlated to an amount of sulfur passing through the SCR component 106 is contemplated as a potential operation to interpret the SCR component sulfur value.

Figure 2:
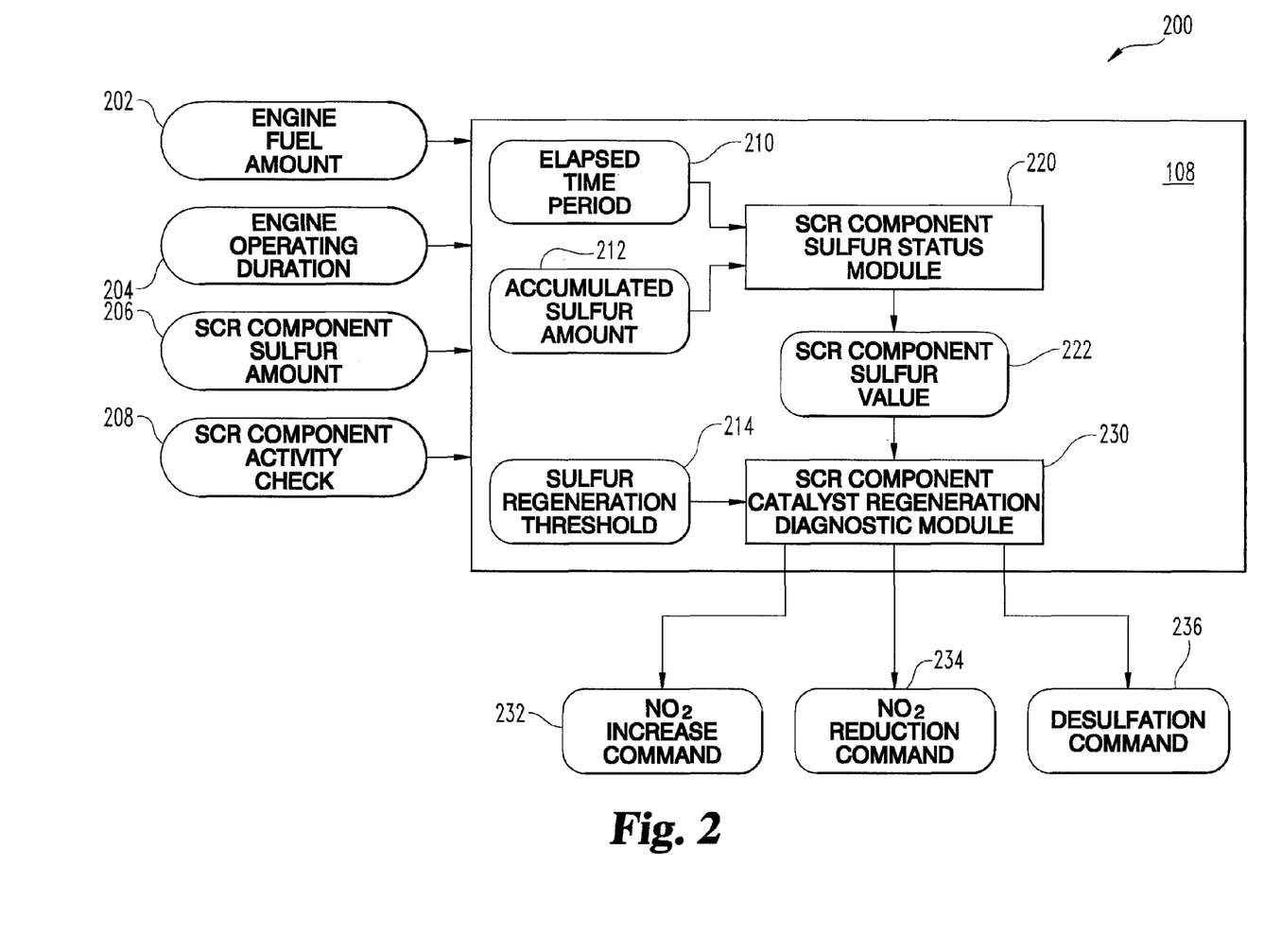
FIG. 2 is a schematic illustration of a controller that functionally executes certain operations to determine a flow imbalance value.

Referencing FIG. 2, a schematic illustration of a processing subsystem 200 including the controller 108 is depicted. The controller 108 includes a plurality of inputs including an engine fuel amount input 202, an engine operating duration input 204 of the engine 102, an SCR component sulfur amount input 206, and an SCR component activity check input 208. The engine fuel amount input 202, which may be a fuel amount burned by the engine 102 and/or injected into the exhaust system through an injector or through very late post injection in the engine 102. The SCR component activity check input 208 may be an active or passive check of catalyst activity, including conversion rates of NO$_x$ to N$_2$ during a period of time where $NH_3$ storage on the catalyst is negligible (e.g. during a high temperature operation), and/or a check of $NH_3$ storage capacity.

The controller 108 further includes an SCR component sulfur status module 220 and an SCR catalyst regeneration diagnostic module. In the illustrated embodiment, the SCR component sulfur status module 220 is structured to receive and interpret an elapsed time period 210, such as from a counter internal to the controller 108 and an accumulated sulfur amount 212, which may be an aggregate of the SCR component sulfur amount input 206 stored in the memory location of the controller 108. It is contemplated that in certain embodiments the SCR component 106 may not include the elapsed time period 210. The SCR component sulfur status module 220 is further structured to determine an SCR component sulfur value 222 in response to the elapsed time period 210 and the accumulated sulfur amount 212, and transmit the SCR component sulfur value 222 to the SCR component catalyst regeneration diagnostic module 230.

The SCR component catalyst regeneration diagnostic module 230 is structured to receive and interpret the SCR component sulfur value 222 from the catalyst status module and a sulfur regeneration threshold 214, which may be stored in the memory location of the controller 108. The SCR component catalyst regeneration diagnostic module 230 is further structured to determine one or more of an NO increase command 232 and/or an NO2 reduction command 234 in response to the SCR component sulfur value 222 and the sulfur regeneration threshold 214. In certain embodiments, the SCR catalyst regeneration diagnostic module may be further structured to output a desulfation command 236, which includes a command directed toward operating at an elevated temperature to recover the catalytic activity of the SCR component 106.

An example controller 108 includes the SCR component sulfur status module 220 further determining the SCR component sulfur value 222 in response to the engine fuel amount input 204. Additionally or alternatively, the SCR component sulfur status module 220 may further determine the SCR component sulfur value 222 in response to the engine operating duration input 206 and/or the SCR component activity check input 208.

In certain embodiments, the NO increase command 232 and/or the NO2 reduction command 234 may include one or more of an exhaust flow rate increase command, an EGR fraction reduction command, an intake throttle valve command, an exhaust throttle valve command, an exhaust gas temperature increase command, a reductant addition command, and/or an oxidation catalyst bypass valve command.

Figure 3:
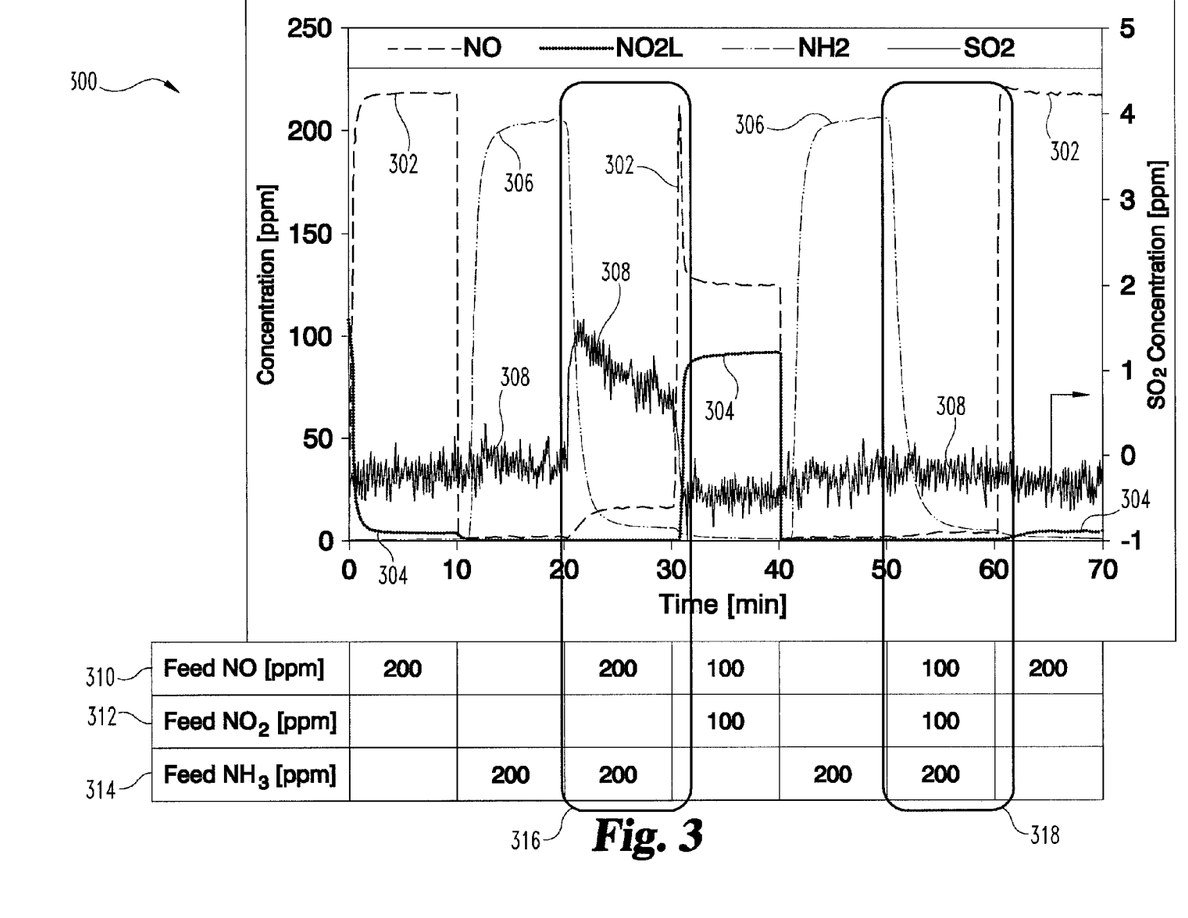
FIG. 3 is a line chart illustrating sulfur removal at 400° C. feed gas temperature with various selective catalytic reductant inlet concentrations of NO, NO2, and NH3.

Referencing FIG. 3, data 300 taken for an SCR catalyst includes a first curve 302 depicting NO inlet 310, a second curve 304 depicting $NO_2$ inlet 312, a third curve 306 depicting $NH_3$ inlet 314, and a fourth curve 308 depicting $SO_2$ at the SCR catalyst outlet. All data is taken at 400° C. feed gas temperature. In the first 10 minutes of depicted data, NO alone is provided as the feed gas additive, and in the second 10 minutes of depicted data, $NH_3$ alone is provided as the feed gas additive. It can be seen in the fourth curve 308 that no significant SO2 release occurs in the presence of either NO or $NH_3$ alone. In the third 10 minutes 316 of the depicted data, $NH_3$ and NO are added to the feed gas in equimolar ratios, and a clear $SO_2$ release is indicated. $SO_2$ release at 400° C. is significantly better performance at lower temperature than is otherwise known in the art, which generally requires 500°-700° C. temperatures to regenerate an SCR catalyst from sulfur poisoning within an acceptable time frame. The fourth 10 minutes of the depicted data shows equimolar NO and $NO_2$ provided in the feed gas, and the fifth 10 minutes includes a stage of just ammonia added to the feed gas. The sixth 10 minutes 318 of the depicted data shows equimolar NO and $NO_2$ provided in the feed gas with the addition of a total amount of ammonia to provide an ANR (ammonia-to-$NO_x$ ratio) of 1. At the temperature the data was taken at, only the NO and $NH_3$ added to the feed gas provided for significant $SO_2$ release. An engine in normal operations with a standard oxidation catalyst will typically have a significant portion of the $NO_x$ at the SCR catalyst component being $NO_2$, which may be 50% or higher $NO_2$ fraction.

Figure 4:
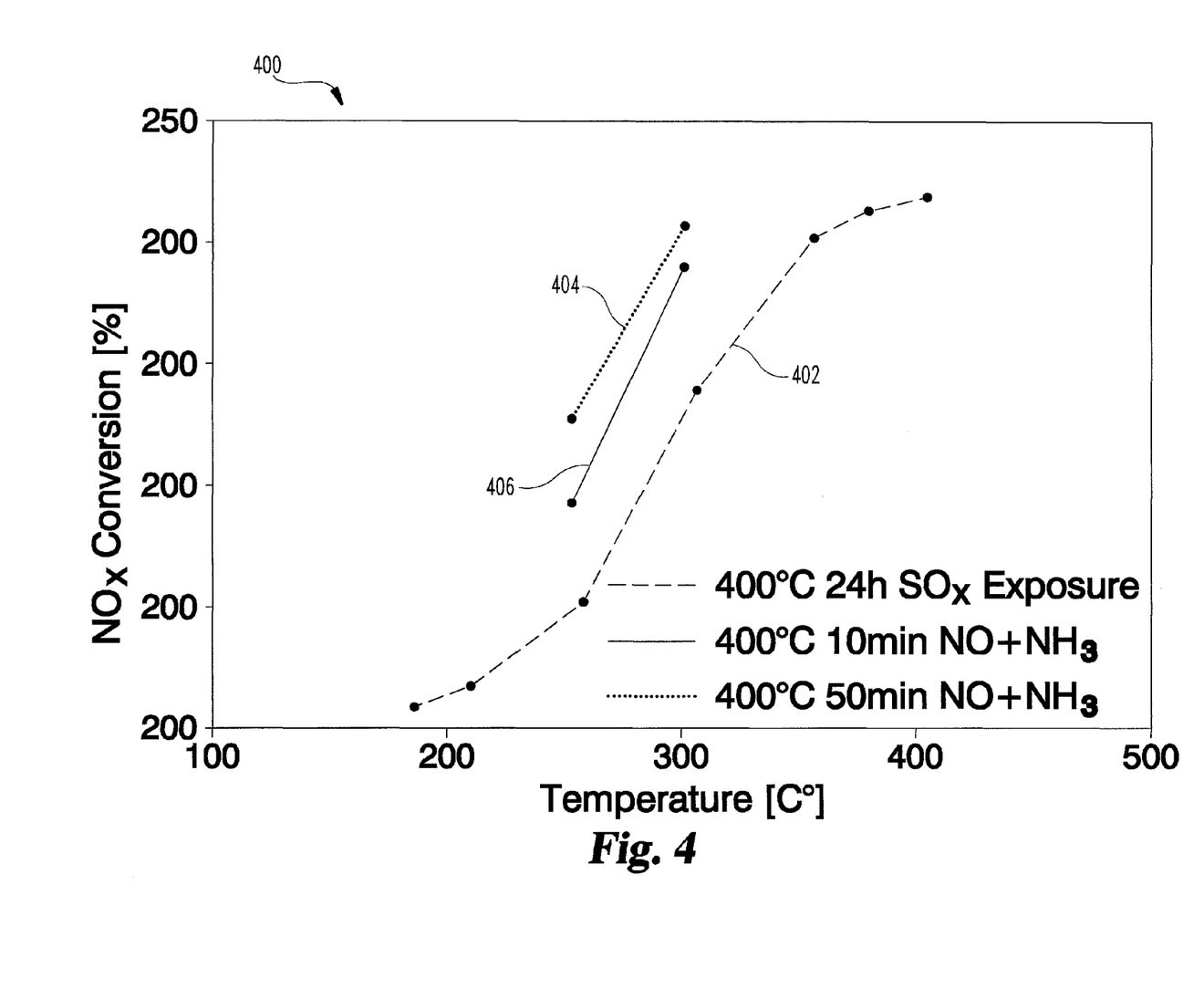
FIG. 4 is a line chart illustrating an improvement in NOx conversion with progressive treatment with NO+NH3 at 400° C. feed gas temperature.

Referencing FIG. 4, several operating curves 402, 404, 406 of a data set 400 were taken for an SCR catalyst. The operating curve 402 is the NOx conversion operating curve for the SCR catalyst after $SO_x$ exposure for 24 hours at 400° C. The operating curve 406 depicts the NO conversion operating curve for the $SO_x$ exposed SCR catalyst after 10 minutes at 400° C. with an equimolar NO and $NH_3$ added to the feed gas at concentrations typically observed in an operating engine. The operating curve 404 depicts the NO conversion operating curve for the SOx exposed SCR catalyst after 50 minutes at 400° C. with an equimolar NO and $NH_3$ added to the feed gas at concentrations typically observed in an operating engine. It can be seen that the utilization of NO with a reductant can significantly reduce the temperature required for the SCR catalyst to recover from sulfur exposure in a reasonable time period. The regeneration operations described herein may be performed as a service event, for example taking the catalyst offline from the application (e.g. a vehicle) and putting the SCR catalyst into a service unit, or by putting an exhaust flow adapter or other special service device onto the application to provide the regeneration operations. Additionally or alternatively, the regeneration operations may be provided as a runtime operation to recover some of the SCR catalyst activity. An application may include both regeneration types, such as a short opportunistic regeneration at runtime to take advantage of an extended period of high load or raised exhaust temperatures, and a longer service event regeneration performed as a maintenance or fault responsive operation.

The schematic flow descriptions which follow provide illustrative embodiments of performing procedures for regenerating an SCR catalyst from sulfur exposure. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 5:
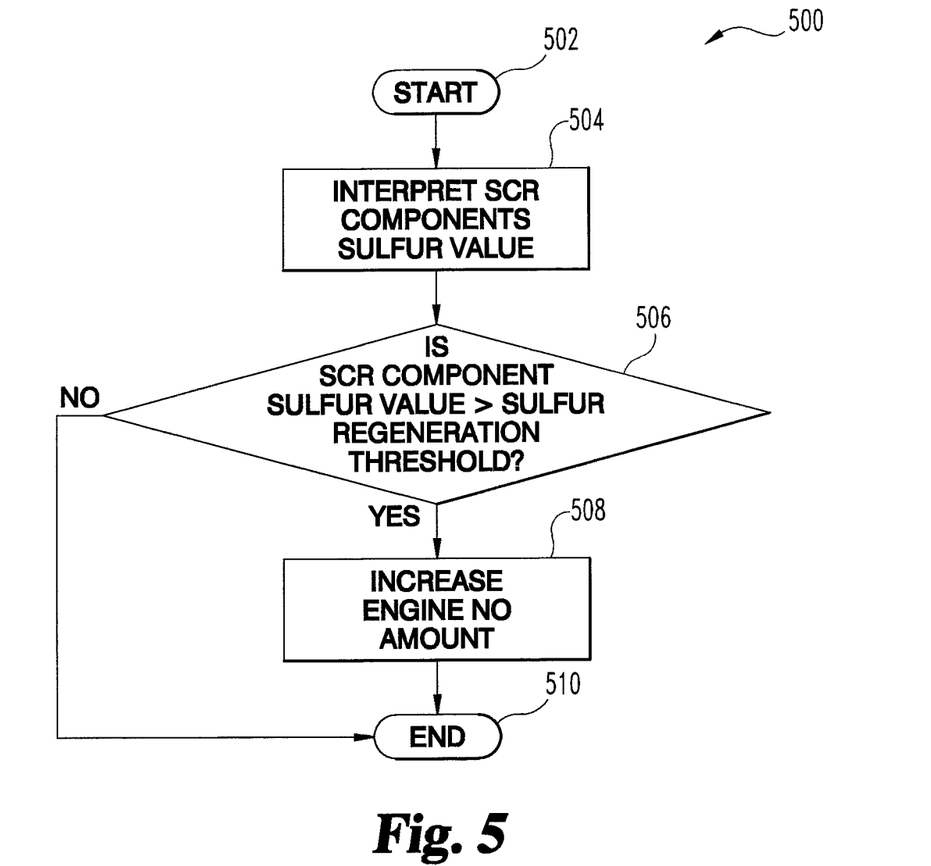
FIG. 5 is a flow diagram illustrating an exemplary procedure for regenerating an SCR catalyst exposed to sulfur.

FIG. 5 illustrates a flow diagram of an exemplary procedure 500 for regenerating the SCR catalyst from sulfur exposure. Procedure 500 begins at operation 502, in which a process for regenerating the SCR catalyst 106 from sulfur exposure is performed. Operation 502 may begin by interpreting a key-on event, completion of a cycle, restarting procedure 500 upon completion, or by initiation by the operator or a technician.

Procedure 500 continues to operation 504 to interpret a sulfur value of the SCR component. From operation 504, procedure 500 continues to conditional 506 to determine whether the SCR component sulfur value is greater than a sulfur regeneration threshold. If the SCR component sulfur value is less than or equal to the sulfur regeneration threshold, procedure 500 proceeds to operation 510, where procedure 500 ends. If the SCR component sulfur value is greater than the sulfur regeneration threshold, then procedure 500 continues to operation 508 to increase an engine NO amount incident to the SCR component.

In certain embodiments, procedure 500 may further include an operation to interpret the SCR component sulfur value by an operation including at least one of: determining that an amount of fuel has been combusted by an engine, determining that an operating duration of the engine exceeds an engine operating duration threshold, determining that an elapsed time since a previous sulfur regeneration operation has occurred, determining that an accumulated amount of sulfur has passed through the SCR component, and/or performing an SCR component catalyst activity check and determining that the SCR component catalyst activity has fallen below a threshold value.

Certain further embodiments of procedure 500 include one or more of the features described following. Procedure 500 may include an operation to increase the NO amount by reducing a conversion of NO to $NO_2$ across an upstream oxidation catalyst, and in certain embodiments the operation to reduce the conversion of NO to $NO_2$ across the upstream oxidation catalyst includes an operation to increase an exhaust flow rate. In certain embodiments, an operation to increase the exhaust flow rate includes an operation to incrementally open an intake throttle valve and/or an exhaust throttle valve. An example procedure 500 may include an operation to increase the NO amount by reducing an engine gas recirculation (EGR) fraction. A further example procedure 500 may include an operation to reduce the conversion of NO to $NO_2$ across the upstream oxidation catalyst by increasing exhaust gas temperature (EGT), and/or by increasing the EGT by adding hydrocarbon to an exhaust passage upstream of an oxidation catalyst, and/or adding by hydrocarbon into a cylinder of an engine. In certain embodiments, the operation to reduce the conversion of NO to $NO_2$ across the upstream oxidation catalyst includes an operation to add reductant by: adding hydrocarbon to an exhaust passage upstream of an oxidation catalyst, and/or adding hydrocarbon into a cylinder of an engine.

Another example procedure 500 may include an operation to increase the NO amount by incrementally opening a bypass valve that bypasses at least a portion of exhaust gases around an upstream oxidation catalyst, and/or by providing an upstream oxidation catalyst having a Pt:Pd ratio selected to produce an $NO_2$:NO ratio that is lower than a threshold value for at least one selected engine operating condition. In certain embodiments, the selected engine operating condition includes an engine operating condition selected in response to a desulfurization engine operating condition.

As is evident from the figures and text presented above, a variety of embodiments are contemplated and various aspects of the apparatus and methods are disclosed herein. For example, one aspect involves a method that includes operating an engine to produce an exhaust gas having a $NO_x$ constituent, the engine operationally coupled to an exhaust system for receiving the exhaust gas, the exhaust system including an exhaust aftertreatment system that includes a selective catalytic reduction (SCR) component disposed in the exhaust gas flow, interpreting a sulfur value of the SCR component, and determining whether the sulfur value exceeds a sulfur regeneration threshold. The method further includes determining an engine NO amount increase incident to the SCR component in response to the sulfur value being greater than the sulfur regeneration threshold and increasing an NO amount delivered into the exhaust system based on the engine NO amount increase.

In another embodiment of the method, the interpreting the sulfur value and determining whether the sulfur value exceeds the sulfur regeneration threshold include operations selected from the operations consisting of: determining that an amount of fuel has been combusted by the engine, determining that an operating duration of the engine exceeds an engine operating duration threshold, determining that an elapsed time since a previous sulfur regeneration operation has occurred, and determining that an accumulated amount of sulfur has passed through the SCR component. The embodiment further includes performing a check of the SCR component catalyst activity and determining that the SCR component catalyst activity has fallen below a threshold value.

In still another embodiment, increasing the NO amount further comprises at least one of reducing a conversion of NO to $NO_2$ across an oxidation catalyst positioned upstream of the SCR component, incrementally opening a bypass valve structured to bypass at least a portion of exhaust gases around an oxidation catalyst positioned upstream of the SCR component, and reducing an engine gas recirculation (EGR) fraction.

In one refinement of the embodiment, reducing the conversion of NO to $NO_2$ across the oxidation catalyst comprises at least one of increasing an exhaust flow rate and increasing an exhaust gas temperature (EGT). In another refinement, increasing the exhaust flow rate comprises incrementally opening one of an intake throttle valve and an exhaust throttle valve. In still another refinement, increasing the EGT comprises adding reductant by at least one operation of adding hydrocarbon to an exhaust passage upstream of the oxidation catalyst and adding hydrocarbon into a cylinder of the engine.

In another refinement of the embodiment, the refinement includes further providing the oxidation catalyst having a Pt:Pd ratio selected to produce an $NO_2$:NO ratio that is lower than a threshold value for at least one selected engine operating condition. In still another refinement, the at least one selected engine operating condition comprises an engine operating condition selected in response to a desulfurization engine operating condition.

Another aspect involves a system that includes an internal combustion engine producing an exhaust gas having a $NO_x$ constituent, a selective catalytic reduction (SCR) component operationally coupled to an exhaust aftertreatment system, the exhaust aftertreatment system operationally coupled to the internal combustion engine to receive the exhaust gas, an oxidation catalyst operationally coupled to the exhaust aftertreatment system at a position upstream of the SCR component, a means for increasing an engine NO amount incident to the SCR component, and a controller. The controller is structured to interpret an SCR component sulfur value, determine whether the SCR component sulfur value exceeds a sulfur regeneration threshold, and provide an NO increase command in response to the SCR component sulfur value exceeding the sulfur regeneration threshold. The means for increasing the engine NO amount incident to the SCR component is responsive to the NO increase command.

An embodiment of the system includes the means for increasing the engine NO amount incident to the SCR component being a means for increasing an exhaust flow rate of the exhaust gas. Example and non-limiting means for increasing an exhaust flow rate of the exhaust gas include providing an increased engine power output, providing a gear ratio change command and the system including a transmission responsive to the gear ratio change command, opening an exhaust throttle and/or an intake throttle, and/or providing a variable geometry turbocharger (VGT) change command and the system further comprising a VGT responsive to the VGT change command.

Another embodiment of the system includes the means for increasing the engine NO amount incident to the SCR component being a means for increasing an exhaust gas temperature (EGT). Example and non-limiting means for increasing an EGT include a device structured to deliver hydrocarbons to an oxidation catalyst positioned upstream of the SCR catalyst component, changing an engine operating point in an iso-power manner, changing an engine operating point, providing a gear ratio change command and the system including a transmission responsive to the gear ratio change command, an exhaust throttle and/or an intake throttle, a variable geometry turbocharger, a hydrocarbon doser, a common rail fuel system, an engine combustion recipe change and actuators responsive to the engine combustion recipe change, and/or a close-coupled oxidation catalyst.

Still another embodiment of the system includes the means for increasing the engine NO amount incident to the SCR component being a means for reductant inhibition on the oxidation catalyst. Example and non-limiting means for reductant inhibition include a reductant provider operationally coupled to the exhaust gas at a position upstream of the oxidation catalyst, and in certain further embodiments the reductant provider includes an HC injector/doser, a means for providing in-cylinder fuel that is unburned or only partially burned, a reductant injector/doser, and a means for providing $H_2$. Example and non-limiting means for providing in-cylinder fuel that is unburned or only partially burned include a post injection device, a very late post injection device, and/or a valve timing adjustment device. Example and non-limiting means for providing $H_2$ include a compressed $H_2$ source, a fuel reformer, and/or an electrolysis device.

Yet another embodiment of the system includes the means for increasing the engine NO amount incident to the SCR component being a means for increasing a $NO_x$ flux of the engine. Example and non-limiting means for increasing the $NO_x$ flux of the engine include decreasing an EGR amount and/or EGR fraction of the engine charge flow, increasing or allowing an increase in a temperature of an EGR amount, advancing a fueling timing value, and/or adjusting a valve timing value (e.g. to provide an increased effective compression ratio). An example system further includes a bypass valve that selectively bypasses at least a portion of the exhaust gas around the oxidation catalyst, where the controller further determines a bypass amount in response to the NO increase command, and where the bypass valve is responsive to the NO increase command. For example, a controller determines a conversion efficiency of the oxidation catalyst for NO to $NO_2$ under present conditions, determines the NO amount at the oxidation catalyst inlet, and provides a bypass command that bypasses a portion of the exhaust gases around the oxidation catalyst that provides a desired NO amount in the exhaust gas downstream of the oxidation catalyst. The bypass valve may be an on/off valve or a variable valve, and a variable bypass valve may be a continuously variable valve or a valve having a discrete number of available positions.

In certain embodiments, the bypass valve is operationally coupled to the exhaust stream and a bypass stream, where the bypass stream passes around the oxidation catalyst, and the system further includes a second oxidation catalyst operationally coupled to the bypass stream. The second oxidation catalyst includes a Pt:Pd ratio selected to produce an $NO_2$:NO ratio that is lower than a threshold value for at least one selected engine operating condition, and/or the second oxidation catalyst includes a Pt:Pd ratio that is lower than a Pt:Pd ratio of the first oxidation catalyst. An example selected engine operating condition includes an engine operating condition selected in response to a desulfurization engine operating condition, for example, a high temperature condition sufficient to regenerate an aftertreatment component from sulfur contamination, a temperature and hydrocarbon concentration sufficient to provide a downstream temperature sufficient to regenerate an aftertreatment component from sulfur contamination, and/or a temperature and hydrocarbon concentration sufficient to provide downstream conditions such that a desulfurization temperature will be developed in a downstream component (e.g. a particulate filter).

In certain embodiments, a first or only oxidation catalyst includes a Pt:Pd ratio selected to produce an $NO_2$:NO ratio that is lower than a threshold value for at least one selected engine operating condition, which may be a desulfurization engine operating condition. In certain embodiments, a selected engine operating condition is an exhaust gas temperature of less than 650° C., less than 600° C., less than 550° C., less than 500° C., less than 450° C., less than 400° C., between 350° C. and 450° C., between 375° C. and 425° C., at least 350° C., at least 375° C., at least 400° C., at least 425° C., at least 450° C., at least 475° C., and/or at least 500° C.

According to another aspect, an apparatus includes an SCR component sulfur status module structured to interpret an SCR component sulfur value in response to at least one of an SCR component sulfur amount, an elapsed time period, and an accumulated sulfur amount. The apparatus further includes an SCR component catalyst regeneration diagnostic module structured to provide at least one of an NO increase command, an NO2 reduction command, and a desulfation command in response to the SCR component sulfur value from the SCR component sulfur status module and a sulfur regeneration threshold.

In one embodiment of the apparatus, the SCR component sulfur status module is further structured to interpret the SCR component sulfur value in response to at least one of an amount of fuel burned by an engine, an operating duration of the engine exceeding an engine operating duration threshold, an elapsed time period, an accumulated sulfur amount, and an SCR component catalyst activity check. In another embodiment, the at least one of an NO increase command, an NO2 reduction command, and a desulfation command comprises at least one of the commands selected from the commands consisting of an exhaust flow rate increase command, an EGR fraction reduction command, an intake throttle valve command, an exhaust throttle valve command, an exhaust gas temperature increase command, a reductant addition command, and an oxidation catalyst bypass valve command.

An example set of embodiments is an apparatus including an SCR component sulfur status module that interprets a selective catalyst reduction (SCR) component sulfur value and provides an SCR component sulfur value, a catalyst diagnostic module that provides an NO increase/decrease command in response to receiving the SCR component sulfur value and comparing the SCR component sulfur value to a sulfur regeneration threshold. Certain embodiments of the apparatus include one or more of the features following.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an engine to produce an exhaust gas having a $NO_x$ constituent, the engine operationally coupled to an exhaust system for receiving the exhaust gas, the exhaust system including an exhaust aftertreatment system that includes a selective catalytic reduction (SCR) component disposed in the exhaust gas flow;
    interpreting a sulfur value of the SCR component;
    determining whether the sulfur value exceeds a sulfur regeneration threshold;
    determining an engine NO amount increase incident to the SCR component in response to the sulfur value being greater than the sulfur regeneration threshold; and
    increasing an NO amount delivered into the exhaust system based on the engine NO amount increase.

2. The method of claim 1, wherein the interpreting the sulfur value and determining whether the sulfur value exceeds the sulfur regeneration threshold comprise operations selected from the operations consisting of:
    determining that an amount of fuel has been combusted by the engine;
    determining that an operating duration of the engine exceeds an engine operating duration threshold;
    determining that an elapsed time since a previous sulfur regeneration operation has occurred;
    determining that an accumulated amount of sulfur has passed through the SCR component; and
    performing a check of the SCR component catalyst activity and determining that the SCR component catalyst activity has fallen below a threshold value.

3. The method of claim 1, wherein the increasing the NO amount further comprises at least one of reducing a conversion of NO to $NO_2$ across an oxidation catalyst positioned upstream of the SCR component, incrementally opening a bypass valve structured to bypass at least a portion of exhaust gases around an oxidation catalyst positioned upstream of the SCR component, and reducing an engine gas recirculation (EGR) fraction.

4. The method of claim 3, wherein the reducing the conversion of NO to $NO_2$ across the oxidation catalyst comprises at least one of increasing an exhaust flow rate and increasing an exhaust gas temperature (EGT).

5. The method of claim 4, wherein the increasing the exhaust flow rate comprises incrementally opening one of an intake throttle valve and an exhaust throttle valve.

6. The method of claim 4, wherein increasing the EGT comprises adding reductant by at least one of:
    adding hydrocarbon to an exhaust passage upstream of the oxidation catalyst; and
    adding hydrocarbon into a cylinder of the engine.

7. The method of claim 3, further providing the oxidation catalyst having a Pt:Pd ratio selected to produce an $NO_2$:NO ratio that is lower than a threshold value for at least one selected engine operating condition.

8. The method of claim 7, wherein the at least one selected engine operating condition comprises an engine operating condition selected in response to a desulfurization engine operating condition.

9. A system, comprising:
    an internal combustion engine producing an exhaust gas having a $NO_x$ constituent;
    a selective catalytic reduction (SCR) component operationally coupled to an exhaust aftertreatment system, the exhaust aftertreatment system operationally coupled to the internal combustion engine to receive the exhaust gas;
    an oxidation catalyst operationally coupled to the exhaust aftertreatment system at a position upstream of the SCR component;
    means for increasing an engine NO amount incident to the SCR component; and
    a controller structured to:
        interpret an SCR component sulfur value;
        determine whether the SCR component sulfur value exceeds a sulfur regeneration threshold; and
        provide an NO increase command in response to the SCR component sulfur value exceeding the sulfur regeneration threshold;
    wherein the means for increasing the engine NO amount incident to the SCR component is responsive to the NO increase command.

10. The system of claim 9, wherein the means for increasing the engine NO amount incident to the SCR component includes at least one of a means for increasing an exhaust flow rate of the exhaust gas, a means for increasing an exhaust gas temperature (EGT), a means for reductant inhibition on the oxidation catalyst, and a means for increasing a $NO_x$ flux of the engine.

11. The system of claim 10, the system further comprising a transmission and a variable geometry turbocharger (VGT), wherein the means for increasing the exhaust flow rate of the exhaust gas comprises at least one of an increased engine power output from the internal combustion engine in response to an engine power output increase command from the controller, a gear ratio change of the transmission in response to a gear ratio change command from the controller, an exhaust throttle opening in response to an exhaust throttle opening command from the controller, an intake throttle opening command in response to an intake throttle opening command from the controller, and a change in a VGT position in response to a VGT change command from the controller.

12. The system of claim 10, wherein the means for increasing the EGT comprises at least one of: an exhaust throttle, a variable geometry turbocharger, a hydrocarbon doser, an engine combustion recipe change and actuators responsive to the engine combustion recipe change, in-cylinder fuel that is unburned or only partially burned, and a close-coupled oxidation catalyst.

13. The system of claim 10, wherein the means for reductant inhibition comprises a reductant provider operationally coupled to the exhaust gas at a position upstream of the oxidation catalyst.

14. The system of claim 13, wherein the reductant provider comprises at least one of: an HC injector/doser, a fuel injector that provides in-cylinder fuel that is unburned or only partially burned, a reductant injector/doser, and an $H_2$ provider.

15. The system of claim 10, further comprising an exhaust gas recirculation (EGR) system including an EGR flow valve and wherein the means for increasing the NOx flux comprises at least one of controlling the EGR flow valve to decrease an EGR amount of an engine charge flow, controlling the EGR flow valve to decrease an EGR fraction of an engine charge flow, controlling the EGR flow valve to increase a temperature of the EGR amount, advancing a fueling timing value to a plurality of cylinders of the internal combustion engine, and adjusting a valve timing value of the plurality of cylinders.

16. The system of claim 10, further comprising a bypass valve structured to selectively bypass at least a portion of the exhaust gas around the oxidation catalyst, and wherein the controller is further structured to determine a bypass amount in response to the NO increase command, and wherein the bypass valve is responsive to the NO increase command.

17. The system of claim 16, wherein the bypass valve comprises one of a variable valve and an on-off valve.

18. The system of claim 16, wherein the bypass valve is operationally coupled to the exhaust stream and a bypass stream, wherein the bypass stream passes around the oxidation catalyst, the system further comprising a second oxidation catalyst operationally coupled to the bypass stream, the second oxidation catalyst comprising a Pt:Pd ratio selected to produce an $NO_2$:NO ratio that is lower than a threshold value for at least one selected engine operating condition.

19. The system of claim 18, wherein the selected engine operation condition comprises an engine operating condition selected in response to a desulfurization engine operating condition.

20. The system of claim 9, wherein the oxidation catalyst comprises a Pt:Pd ratio selected to produce an $NO_2$:NO ratio that is lower than a threshold value for at least one selected engine operating condition.

21. The system of claim 20, wherein the at least one selected engine operating condition includes operation of the SCR component at an EGT selected from at least one of the EGT ranges consisting of: less than 650° C., less than 600° C., less than 550° C., less than 500° C., less than 450° C., less than 400° C., between 350° C. and 450° C., between 375° C. and 425° C., at least 350° C., at least 375° C., at least 400° C., at least 425° C., at least 450° C., at least 475° C., and at least 500° C.

22. An apparatus, comprising:
a controller including a plurality of modules configured to control operation of a system including an internal combustion engine and an exhaust aftertreatment system that receives exhaust gas produced by operation of the internal combustion engine, the exhaust aftertreatment system including a selective catalytic reduction (SCR) component, wherein the plurality of modules include:
an SCR component sulfur status module structured to interpret an SCR component sulfur value in response to at least one of an elapsed time period and an accumulated sulfur amount associated with operation of the internal combustion engine; and
an SCR component catalyst regeneration diagnostic module structured to provide, in response to the SCR component sulfur value from the SCR component sulfur status module exceeding a sulfur regeneration threshold, an NO increase command to increase an NO amount in the exhaust aftertreatment system, an NO2 reduction command to reduce an NO2 amount in the exhaust aftertreatment system, and a desulfation command to operate the exhaust aftertreatment system at an elevated temperature to recover the catalytic activity.

23. The apparatus of claim 22, wherein the SCR component sulfur status module is further structured to interpret the SCR component sulfur value in response to at least one of an amount of fuel burned by the internal combustion engine, an operating duration of the internal combustion engine exceeding an engine operating duration threshold, and an SCR component catalyst activity check.

24. The apparatus of claim 22, wherein the at least one of an NO increase command, an NO2 reduction command, and a desulfation command comprises at least one of:
an exhaust flow rate increase command;
an exhaust gas recirculation fraction reduction command;
an intake throttle valve command;
an exhaust throttle valve command;
an exhaust gas temperature increase command;
a reductant addition command; and
an oxidation catalyst bypass valve command.

* * * * *